United States Patent [19]

Dawley

[11] 4,441,329
[45] Apr. 10, 1984

[54] TEMPERATURE CONTROL SYSTEM
[76] Inventor: Robert E. Dawley, 123 Bacon St., Natick, Mass. 01760
[21] Appl. No.: 395,862
[22] Filed: Jul. 6, 1982
[51] Int. Cl.³ ............... F25B 49/00; F25B 21/02; G05D 23/30
[52] U.S. Cl. .................... 62/126; 62/127; 62/3; 62/202; 236/94; 236/68 B; 340/515
[58] Field of Search ............ 62/126, 125, 127, 130, 62/202, 3; 236/94, 68 B; 165/11 R; 374/115, 167, 1, 3; 364/184, 185, 186, 557; 340/515, 587; 371/23

[56] References Cited
U.S. PATENT DOCUMENTS

| 4,122,720 | 10/1978 | Podl | 364/557 X |
| 4,283,921 | 8/1981 | Prosky | 62/126 |
| 4,324,138 | 4/1982 | Davis et al. | 374/167 X |
| 4,364,234 | 12/1982 | Reed | 62/130 X |

FOREIGN PATENT DOCUMENTS

| 53-3798 | 1/1978 | Japan | 340/515 |
| 53-77199 | 7/1978 | Japan | 340/515 |

Primary Examiner—Albert J. Makay
Assistant Examiner—Harry Tanner
Attorney, Agent, or Firm—John E. Toupal; Harold G. Jarcho

[57] ABSTRACT

A temperature control system including an enclosure defining a zone to be temperature controlled, a primary temperature conditioner for controlling ambient temperature within the zone, a temperature sensing mechanism for producing temperature signals dependent on localized temperature within the zone, a controller for controlling the primary temperature conditioner in response to the temperature signal, an error detector for monitoring the temperature signal and producing error signals in response to predetermined abnormal output conditions thereof, an auxiliary temperature conditioner disposed in close heat transfer relationship with the sensing mechanism and selectively energizable during test periods to substantially alter the localized temperatures sensed by the sensing mechanism without substantially changing the ambient temperature within the zone, and a fault detector for producing fault signals in response to given defective output conditions of the temperature signal during the test periods.

15 Claims, 2 Drawing Figures

TEMPERATURE CONTROL SYSTEM

BACKGROUND OF THE INVENTION

The invention relates generally to a temperature control system and, more particularly, to a refrigeration system specifically suited for the storage of frozen parenteral solution filled containers.

In blood bank storage facilities the life expectancy of stored blood is significantly affected by the resident storage temperature. Experimental evidence indicates that the usual life of the stored blood is reduced substantially by variations of storage temperature from an optimum 4° C. Consequently, blood bank storage facilities rely on well controlled temperature chambers with well designed and controlled temperature profiles that strive for good temperature uniformity throughout the storage area. However, air flow conditions within the facility depend upon the storage density that is in turn affected by a user loading and unloading of the blood containers. For that reason, existing storage facilities provide a substantially variable temperature profile that significantly reduces both the life and quality of the stored blood.

Another problem associated with blood bank facilities is the ever present possibility of intermittent periods in which a refrigeration system becomes dysfunctional exposing the blood contents to widely varying storage temperatures. Since such occurences will substantially degrade the quality of the stored blood, reliable temperature monitoring is essential. To assure that the refrigeration system is functioning correctly, agencies such as the Red Cross require careful, frequent calibration checkes which are performed manually. Such tests generally are made daily and typically entail temperature tests with thermometers and atests of fault detection systems by alternately subjecting temperature sensors to ice and warm water baths. Obviously, such manual test procedures are both labor intensive and subject to error.

The object of this invention, therefore, is to provide a blood bag storage facility in which storage temperature is continuously monitored, indications of system malfunction are provided automatically and periodic automatic integrity tests are made of the monitoring systems.

SUMMARY OF THE INVENTION

The invention is a temperature control system including an enclosure defining a zone to be temperature controlled, a primary temperature conditioner for controlling ambient temperature within the zone, a temperature sensing mechanism for producing temperature signals dependent on localized temperature within the zone, a controller for controlling the primary temperature conditioner in response to the temperature signal, an error detector for monitoring the temperature signal and producing error signals in response to predetermined abnormal output conditions thereof, an auxiliary temperature conditioner disposed in close heat transfer relationship with the sensing mechanism and selectively energizable during test periods to substantially alter the localized temperatures sensed by the sensing mechanism without substantially changing the ambient temperature within the zone, and a fault detector for producing fault signals in response to given defective output conditions of the temperature signal during the test periods. By periodically energizing the auxiliary temperature conditioner, the sensed localized temperature can be either raised or lowered to abnormal levels without materially effecting the ambient temperature within the zone. In the absence of error signals indicating those abnormal levels during the test periods, the fault detector produces fault signals indicating some defect in the temperature sensing mechanism.

According to one feature of the invention, the sensing mechanism comprises a plurality of individual signal producing sensors disposed in spaced apart locations within the zone, and the auxiliary temperature conditioner comprises a plurality of thermoelectric modules each in intimate heat exchanging relationship with a different one of the sensors. The thermo-electric modules provide an extremely effective means for producing during the test periods abnormal temperature conditions in the localized areas associated with each sensor.

According to another feature of the invention, the auxiliary temperature conditioner comprises a test control circuit for sequentially applying opposite polarity voltages to the thermo-electric modules so as to sequentially produce abnormally high and low localized temperatures for detection by the sensors. The test control circuit includes a test timer for periodically producing the test periods.

According to another feature of the invention, the error detector includes an error timer, the abnormal output conditions constitute the continuous presence of the abnormal temperature signals over a predetermined delay period provided by the error timer, and the fault detector responds to the defective output conditions in a shorter period than the predetermined delay period. This arrangement permits the error detector circuit to function as a detector both during normal temperature monitoring periods and during the test periods.

According to still another feature of the invention, the system includes both local and remote alarm systems, the error timer includes a first timer for producing a first error signal in response to the continuous presence of abnormal temperature signals during a first period and a second timer for producing a second error signal in response to the continuous presence thereof during a second period longer than the first period, and the first error signal activates the local alarm system and the second error signal activates the remote alarm system. According to this arrangement, a local alarm system is activated in response to a relatively short period of abnormal sensor output and a remote alarm system is activated in response to a more serious longer abnormal output.

According to another feature of the invention, the system includes a multiplexor for sequentially and independently applying the temperature signals to the error detector, the test control circuit includes a sequencer for sequentially monitoring successive ones of the temperature signals after a previously monitored temperature signal becomes abnormal, and a sequence timer for producing the fault signal when any one of the temperature signals fails to become abnormal during a given sequence test period. This arrangement facilitates the sequential integrity testing of all sensors during each test period.

According to a preferred embodiment of the invention, the primary temperature conditioner comprises a refrigeration system, the enclosure retains a plurality of substantially uniformly sized frozen parenteral solution filled bags, and each of the thermo-electric modules has a mass slightly less than the mass of the individual bags and heat transfer characteristics substantially identical thereto. This combination ensures that the temperature sensors will respond more quickly to ambient temperature changes than the containers thereby assuring a more uniform temperature profile therefor.

According to another feature of the invention, the system includes a line test circuit for monitoring line voltage applied to the system, the line test circuit also produces a fault signal in response to abnormal line voltage, and the system further includes a circuit means for deactivating the refrigeration system in response to a fault signal from the line test circuit. This arrangement prevents potentially harmful operation of the refrigeration compressor during periods of low line voltage.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
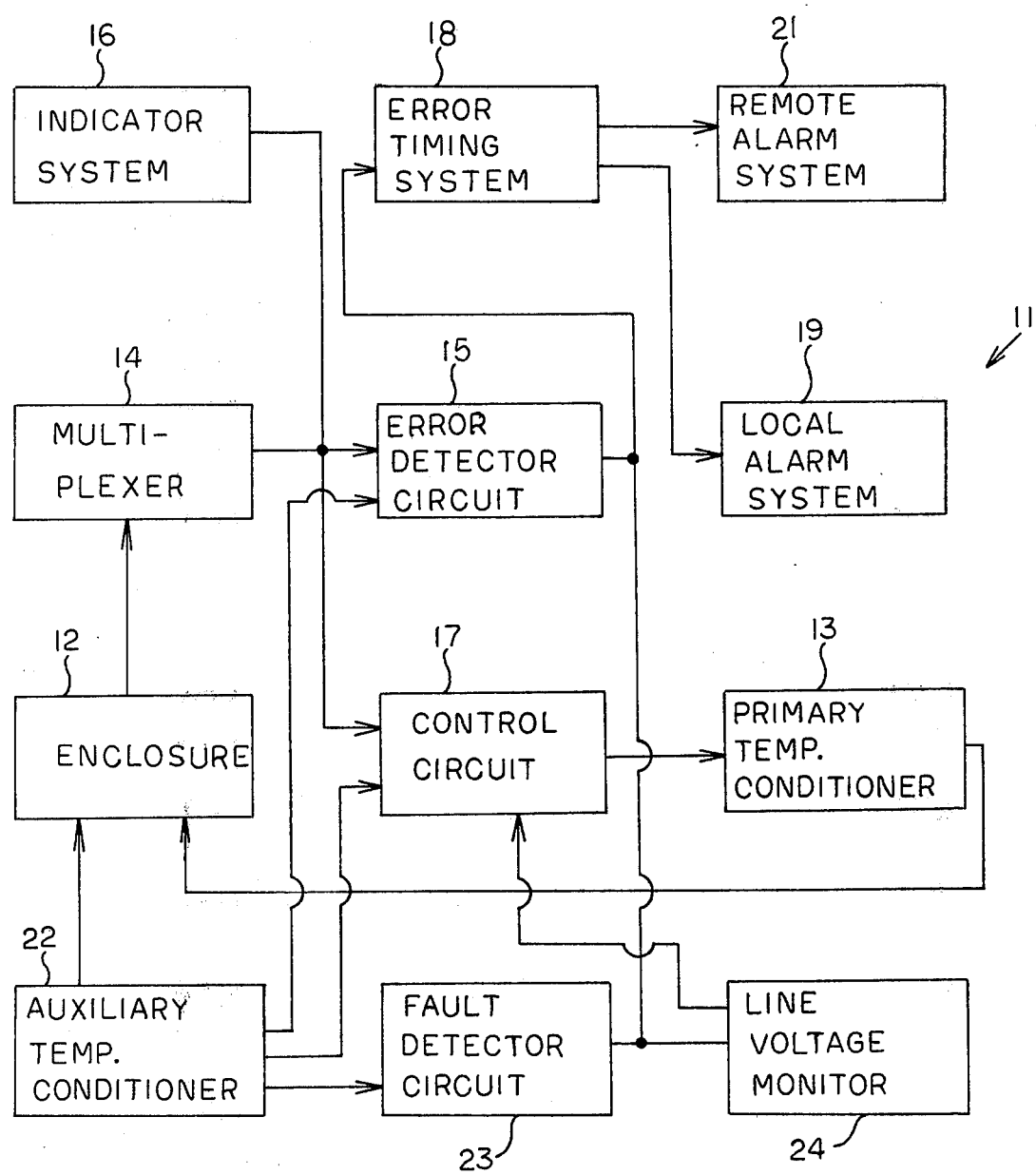
FIG. 1 is a schematic block circuit diagram of the invention.

The temperature control system 11 shown in FIG. 1 includes an enclosure 12 which in a preferred embodiment is a refrigerated housing for the storage of blood bags. Temperature conditioning of the zone enclosed by the enclosure 12 is provided by a primary temperature conditioner 13 which in the preferred embodiment is a refrigeration compressor. Multiple temperature signals indicative of localized temperature at various locations within the enclosure 12 are sequentially transmitted by a multiplexor 14 to a detector circuit 15. Also receiving temperature signals from the multiplexor 14 is an indicator system 16 and a control circuit 17 that controls operation of the primary temperature conditioner 13. Detected temperature error signals from the detector circuit 15 are applied to an error timing system 18 which can produce error signals that activates either a local alarm 19 or a remote alarm 21.

An auxiliary temperature conditioner 22 produces periodic localized temperature changes within the enclosure 12 during test periods when the integrity of the temperature sensing system therein is being evaluated. During the test periods, the auxiliary temperature conditioner 22 exchanges information with the error detector circuit 15 and provides an output to a fault detector circuit 23. In response to an unsuccessful test of the temperature measuring system, the fault detector circuit 23 produces fault signals that are applied to the error timing system 18 and result in activation both the local alarm 19 and the remote alarm 21. An auxiliary supply system 24 responds to abnormally low line voltage by deactivating the control circuit 17 to prevent operation of the primary conditioner 13. Also in response to low line voltage, the auxiliary supply system 24 produces a fault signal that is applied to the error timing system 18 and results in activation of the alarms 19 and 21.

Figure 2:
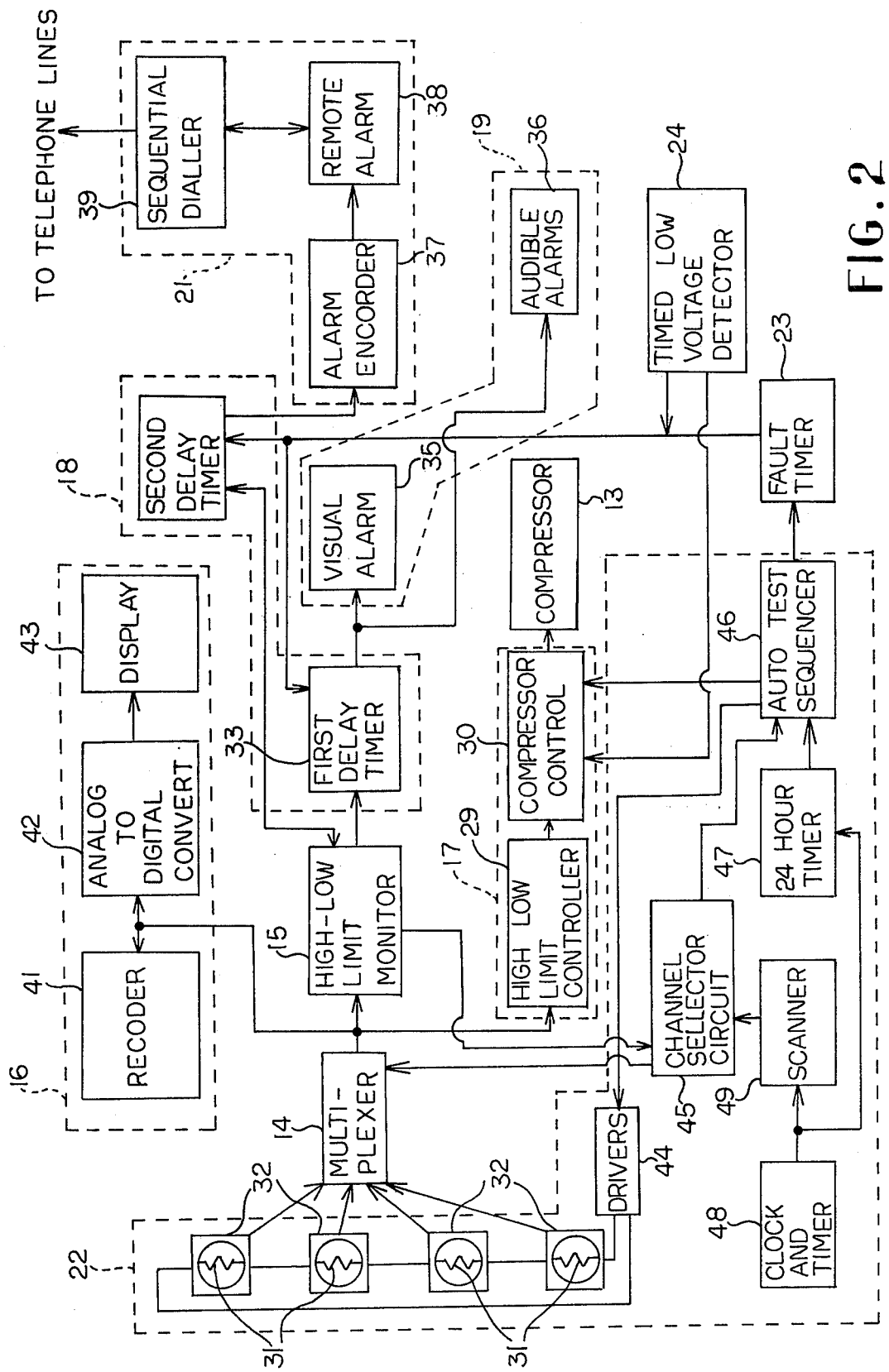
FIG. 2 is a more detailed schematic block circuit diagram of the invention.

Referring now to FIG. 2 the temperature control system 11 is shown in greater detail. Disposed in strategically spaced apart locations within the enclosure 12 are a plurality of temperature sensors 31 which depending upon an operating temperature desired can consist of, for example, either thermistors or sections of platinum wire. Sandwiching each of the sensors 31 so as to be intimate heat exchanging relationship therewith are thermo-electric modules 32. The multiple outputs of the sensors 31 are sequentially applied by the multiplexor 14 to the error detector circuit 15 that consists of a high-low limit monitor. Receiving the output of the monitor 15 is the error timing system 18 that includes of a first delay timer 33 and a second delay timer 34. An error output signal from the first delay timer 33 activates both a visual alarm 35 and an audible alarm 36. Similarly, an error output from the second delay timer 34 is applied to an alarm encoder 37 that activates both a remote alarm 38 and a sequential dialer system 39. Also receiving the signal output from the multiplexor 14 is the controller circuit 17 that includes a high-low limit controller 29 and a compressor control circuit 30 and the output indicator system 16 that includes a recorder 41 and an analog to digial converter 42 that feeds a display 43. In addition to the thermo-electric modules 32, the auxiliary temperature conditioner 22 includes electrical drivers 44 therefor, a channel selector circuit 45, an automatic test sequencer 46, a 24 hour timer 47, a clock and timer 48 and a scanner 49.

OPERATION OF THE INVENTION

During normal operation the sensors 31 provide signals indicative of the temperature at various locations within the enclosure 12 and those outputs are continuously scanned at a rate preferably less than 2 hertz by the multiplexor 14. The output from the multiplexor 14 is both recorded by the recorder 41 and displayed by the display 43. Also receiving the multiplexor output is the high-low limit controller 29 that causes the compressor control 30 to cycle the compressor 13 and thereby maintain a desired ambient temperature within the enclosure 12. If the desired temperature limits within the enclosure 12 are exceeded high or low, the resultant temperature signals from the sensors 31 are detected by the high-low limit monitor 15 that possesses a slightly wider detection window than does the limit controller 29. The output from the limit monitor 15 initiates a timing period by the first timer 14 and if the abnormal temperatures is sustained for that entire period, the first timer 14 produces a error output signal that energizes both the visual alarm 35 and the audible alarm 36. Also initiated by an output from the limit monitor 15 is the second delay timer 34 that provides a delay period longer than that provided by the first timer 33. In the event that the abnormal temperature conditions are sustained for that longer delay period, the second timer 34 produces an output error signal that is applied to the alarm encoder 37. After receiving an error signal, the alarm encoder 37 causes the remote alarm 38 to produce a coded alarm and the sequential dialer automatically provides to service personnel via telephone lines an identification of the troubled location.

At predetermined intervals of, for example, once each 24 hour period, the timer 47 activates the test sequencer 46 to initiate a test period. After being activated by the timer 47, the test sequencer 46 deactivates the compressor control 30 to prevent erratic compressor operation during the test period, activates the fault detector timer 23 and instructs the drivers 44 to apply a cooling voltage polarity to the thermo-electric modules 32. During the test period, the multiplexor 14 continues to scan the outputs from each of the sensors 31. Because of the localized cooling produced by the thermo-electric modules 32, the sensors 31 produce temperature output signal levels below the lower limit of the limit monitor 15. As the limit monitor 15 sequentially senses an abnormally low output level excursion from a given sensor 31, the output from that particular sensor is removed from the population by the channel selector circuit 45 and an output from a new sensor is monitored. Scanning continues in this way until all of the sensors 31 have responded with abnormally low output level within the time interval provided by the fault timer 23. When the outputs from all of the sensors 31 have responded correctly to the test by indicating abnormal temperature conditions, the test sequencer 23 restarts the fault timer 23 and instructs the drivers 44 to reverse the polarity on the thermo-electric modules 32 to produce therefor a heating cycle. The above described testing procedure is than repeated as the sensors are heated to a level above the upper limit of the limit monitor 15. Upon a successful completion of the heating cycle, the sequencer 23 reverses the polarity on the thermo-electric units 32 to again cool the sensors 31 to a normal value and the test cycle is completed. If any of the sensors prove faulty during either the cooling or heating test cycles, by failing to provide an abnormal temperature output during the fault period provided by the timer 23 a fault output is produced thereby and applied to both the second delay timer 34 and the first delay timer 33. In response to the fault signals, the first timer 33 activates the local visual and audible alarms 35 and 36 and the second timer 34 activates the remote alarm system 21 as described above.

In addition to providing periodic sensing system integrity test cycles, the thermo-electric modules unit 32 provide mass that prevents rapid sensor output changes as a result of transient temperature conditions occurring, for example, in response to door openings or compressor cycling. Preferably the mass of each thermoelectric module 32 is slightly less than that of uniformly sized units being stored within the enclosure 12 and the modules possess heat transfer properties substantially identical thereto. Such an arrangement ensures that the ambient temperature levels sensed by the sensors 31 will lead those experienced by the stored units and a highly controlled environmental storage temperature maintained.

What is claimed is:

1. A temperature control system comprising:
   an enclosure defining a zone to be temperature controlled;
   primary temperature conditioning means for changing the ambient temperature within said zone;
   temperature sensing means for producing a temperature signal dependent on localized temperature within said zone;
   controller means for controlling said temperature conditioning means in response to said temperature signal produced by said sensing means;
   error detection means for monitoring said temperature signal, and for producing error signals in response to predetermined abnormal output conditions thereof;
   auxiliary temperature conditioning means comprising thermoelectric means disposed in intimate heat exchanging contact with said sensing means and selectively energizable during a test period to substantially alter said localized temperature sensed by said sensing means without substantially changing said ambient temperature within said zone; and
   fault means for producing fault signals in response to given defective output conditions of said temperature signal during said test periods.

2. A system according to claim 1 wherein said sensing means comprises a plurality of sensors disposed in spaced apart positions within said zone, and said fault means produces said fault signal in response to given defective output signal conditions from any of said sensors.

3. A temperature control system comprising:
   an enclosure defining a zone to be temperature controlled;
   primary temperature conditioning means for changing the ambient temperature within said zone;
   temperature sensing means for producing a temperature signal dependent on localized temperature within said zone;
   controller means for controlling said temperature conditioning means in response to said temperature signal produced by said sensing means;
   error detection timing means for monitoring said temperature signal and for producing error signals in response to predetermined continuous abnormal output levels thereof above or below a predetermined range for a predetermined time period;
   auxiliary temperature conditioning means disposed in a close heat transfer relationship with said sensing means and selectively energizable during a test period to substantially alter said localized temperature sensed by said sensing means without substantially changing said ambient temperature within said zone; and
   fault means for producing fault signals in response to the absence of said abnormal output levels of said temperature signal during said test periods.

4. A system according to claim 3 including local and remote alarm means, and wherein said error timing means comprises a first timer for producing a first said error signal in response to said abnormal levels continuous during a first period and a second timer for producing a second error signal in response to said abnormal levels during a second period longer than said first period, and said first error signal activates said local alarm means and said second error signal activates said remote alarm means.

5. A temperature control system comprising:
   an enclosure defining a zone to be temperature controlled;
   primary temperature conditioning means for changing the ambient temperature within said zone;
   temperature sensing means for producing a temperature signal dependent on localized temperature within said zone, said sensing means comprising a plurality of sensors disposed in spaced apart locations within said zone, each producing a temperature signal;
   controller means for controlling said temperature conditioning means in response to said temperature signal produced by said sensing means;
   error detection means for monitoring said temperature signal, and for producing error signals in response to predetermined abnormal output conditions thereof;
   auxiliary temperature conditioning means comprising thermoelectric means disposed in intimate heat exchanging contact with said sensing means and selectively energizable during a test period to substantially alter said localized temperature sensed by said sensing means without substantially changing said ambient temperature within said zone, said auxiliary temperature conditioning means comprising a plurality of thermo-electric modules each in intimate heat exchanging relationship with a different one of said sensors; and fault means for producing fault signals in response to given defective output conditions of said temperature signal during said test periods.

6. A system according to claim 5 wherein said abnormal output conditions comprise abnormal levels of said temperature signals outside a predetermined range, and said fault means produces said fault signals in response to a failure of any of said sensors to produce a temperature signal outside said predetermined range during said test periods.

7. A system according to claim 6 wherein said abnormal conditions comprise said abnormal temperature signals above or below said predetermined range, and said auxiliary temperature conditioning means comprise test control means for sequentially applying opposite polarity voltages to said thermo-electric modules so as to sequentially produce heating and cooling thereof.

8. A system according to claim 7 wherein said test control means comprises test timing means for periodically producing said test periods.

9. A system according to claim 7 wherein said error detection means comprises error timing means, and said abnormal output conditions comprise the continuous presence of said abnormal temperature signals over a predetermined delay period.

10. A system according to claim 9 wherein said fault means responds to said given defective output conditions in less than said predetermined delay period.

11. A system according to claim 10 including local and remote alarm means, and said error timing means comprises a first timer for producing a first error signal in response to the continuous presence of said abnormal temperature signals during a first period and a second timer for producing a second error signal in response to the continuous presence of said abnormal temperature signals during a second period longer than said first period, and said first error signal activates said local alarm means and said second error signal activates said remote alarm means.

12. A system according to claim 11 including a multiplexor means for sequentially and independently applying said temperature signals to said error detection means.

13. A system according to claim 12 wherein said test control means comprises sequencer means for sequentially monitoring successive ones of said temperature signals after a previously monitored temperature signal becomes abnormal, and said fault means comprises a sequence timer for producing said fault signal when anyone of said temperature signal fails to become abnormal during a given sequence test period.

14. A system according to claim 13 wherein said primary temperature conditioning means comprises refrigeration means, said enclosure retains a plurality of uniformly sized parenteral solution filled bags, and each of said thermo-electric modules has a mass slightly less than the mass of said individual bags and heat transfer characteristics substantially identical thereto.

15. A system according to claim 14 including a line test means for monitoring line voltage applied to said system, said line test means also producing said fault signal in response to an abnormal line voltage, and means for deactivating said refrigeration means in response to a fault signal from said line test means.

* * * * *